United States Patent
Zeng et al.

(10) Patent No.: US 10,447,655 B2
(45) Date of Patent: Oct. 15, 2019

(54) METHOD FOR CONTROLLING TRANSMISSION SECURITY OF INDUSTRIAL COMMUNICATIONS FLOW BASED ON SDN ARCHITECTURE

(71) Applicant: SHENYANG INSTITUTE OF AUTOMATION, CHINESE ACADEMY OF SCIENCES, Liaoning (CN)

(72) Inventors: Peng Zeng, Liaoning (CN); Wenli Shang, Liaoning (CN); Dong Li, Liaoning (CN); Ming Wan, Liaoning (CN); Jianming Zhao, Liaoning (CN); Jindi Liu, Liaoning (CN); Ming Yang, Liaoning (CN)

(73) Assignee: SHENYANG INSTITUTE OF AUTOMATION, CHINESE ACADEMY OF SCIENCES, Shenyang, Liaoning (CN)

( * ) Notice: Subject to any disclaimer, the term of this patent is extended or adjusted under 35 U.S.C. 154(b) by 196 days.

(21) Appl. No.: 15/525,667

(22) PCT Filed: Dec. 25, 2015

(86) PCT No.: PCT/CN2015/098820
§ 371 (c)(1),
(2) Date: May 10, 2017

(87) PCT Pub. No.: WO2017/016162
PCT Pub. Date: Feb. 2, 2017

(65) Prior Publication Data
US 2017/0339109 A1    Nov. 23, 2017

(30) Foreign Application Priority Data
Jul. 29, 2015   (CN) .......................... 2015 1 0459325

(51) Int. Cl.
*H04L 29/06* (2006.01)
*G05B 19/418* (2006.01)
(Continued)

(52) U.S. Cl.
CPC ........ *H04L 63/0263* (2013.01); *G05B 19/418* (2013.01); *G05B 19/41855* (2013.01);
(Continued)

(58) Field of Classification Search
CPC ... H04L 63/0263; H04L 63/166; H04L 63/20; H04L 29/06; H04L 45/745;
(Continued)

(56) References Cited

U.S. PATENT DOCUMENTS

| 8,711,860 B2 | 4/2014 | Beliveau et al. | |
| 2014/0371941 A1* | 12/2014 | Keller | H02J 13/0006 700/297 |

(Continued)

FOREIGN PATENT DOCUMENTS

| CN | 103051557 | * | 4/2013 |
| CN | 103051557 A | | 4/2013 |

(Continued)

OTHER PUBLICATIONS

International Search Report dated Mar. 2, 2016 for PCT/CN2015/098820 (4 pages—Chinese with English machine translation).

(Continued)

*Primary Examiner* — Kambiz Zand
*Assistant Examiner* — Alexander R Lapian
(74) *Attorney, Agent, or Firm* — Smith, Gambrell & Russell, LLP (57) ABSTRACT

The present invention discloses a method for controlling transmission security of an industrial communication flow based on an SDN architecture. The method comprises: designing a flow security control module in a management (Continued)

controller, performing in-depth parsing on industrial communication flow data, matching the parsing result with each preset industrial rule policy, and executing a control processing operation of the industrial rule policy, to implement transmission control of an industrial communication flow. The management controller comprises an industrial rule policy database used for storing all industrial rule policies set by a user. An SDN switch maintains a structure of a flow table, and an industrial communication flow is forwarded according to the flow table. The flow table comprises a security control identifier used for indicating whether security transmission of this communication flow needs to be controlled. The present invention can detect the legality of an industrial communication data flow, to control access of industrial communication that does not conform to an industrial rule policy, so that the security and reliability of industrial control systems based on an SDN architecture are guaranteed.

20 Claims, 4 Drawing Sheets (51) Int. Cl.
  H04L 12/741 (2013.01)
  H04L 12/937 (2013.01)
  H04L 12/851 (2013.01)
  H04L 12/931 (2013.01)
  H04L 29/08 (2006.01)
(52) U.S. Cl.
  CPC ............ *H04L 29/06* (2013.01); *H04L 45/745* (2013.01); *H04L 47/2441* (2013.01); *H04L 49/253* (2013.01); *H04L 63/166* (2013.01); *H04L 63/20* (2013.01); *G05B 2219/45103* (2013.01); *H04L 49/70* (2013.01); *H04L 69/326* (2013.01)

(58) Field of Classification Search
  CPC ... H04L 47/2441; H04L 49/253; H04L 49/70; H04L 69/326; G05B 19/418; G05B 19/41855; G05B 2219/45103
  See application file for complete search history.

(56) References Cited

U.S. PATENT DOCUMENTS

| | | | |
|---|---|---|---|
| 2015/0110116 A1* | 4/2015 | Gong | H04L 67/1097 370/392 |
| 2017/0041230 A1* | 2/2017 | Huang | H04L 45/745 |
| 2017/0078184 A1* | 3/2017 | Tang | H04L 45/02 |
| 2017/0142212 A1* | 5/2017 | Bifulco | H04L 43/0811 |
| 2017/0279689 A1* | 9/2017 | Mohan | H04L 41/0893 |
| 2017/0331838 A1* | 11/2017 | Schneider | H04L 63/101 |

FOREIGN PATENT DOCUMENTS

| | | |
|---|---|---|
| CN | 103916314 A | 7/2014 |
| CN | 104012063 A | 8/2014 |
| CN | 104660507 A | 5/2015 |

OTHER PUBLICATIONS

Xiang Xing Sanji. Talking about Deep Packet Inspection Technology, Aug. 29, 2008. http://blog.sina.com.cn/s/blog_4b108ce20100afwf. html accessed Dec. 12, 2017.

* cited by examiner

METHOD FOR CONTROLLING TRANSMISSION SECURITY OF INDUSTRIAL COMMUNICATIONS FLOW BASED ON SDN ARCHITECTURE

TECHNICAL FIELD

The present invention relates to the technical field of industrial control system network security, and in particular to a method for controlling transmission security of an industrial communication flow based on an SDN architecture.

BACKGROUND

Figure 1:
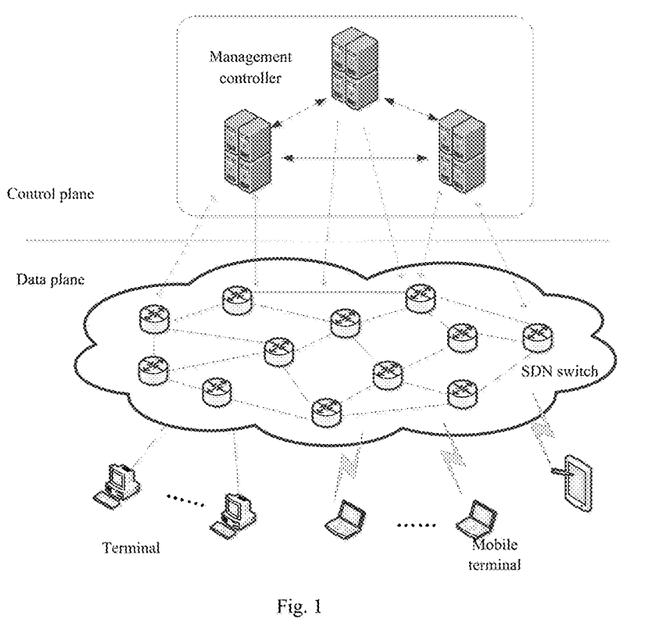
FIG. 1 is a schematic diagram showing a basic architecture of an SDN in the present invention.

With the development of network technologies, since the existing network structure cannot meet the requirements of rapidly expanded network scales and constantly enriched application types, all the countries in the world have carried out researches on future network architectures and have made some progress. A software defined network (SDN) has received extensive attention from industry and academia, which is a novel network innovation architecture, and is a manner for implementing network virtualization. The core technology, i.e. OpenFlow implements the flexible control of network traffic by separating a control plane of a network device from a data plane, so that a network as a pipeline becomes more intelligent. A control function is separated from the network device by the SDN, a flow table structure is maintained on an SDN switch, data packets are forwarded according to a flow table, and the generation, maintenance and configuration of the flow table are managed by a management controller. The flow table structure flattens network processing levels, so that the processing of network data meets the processing requirements of fine granularity. Under such a forwarding and control separation architecture, a logic control function of the network and a high-level policy can be flexibly managed and configured dynamically by the management controller, and a novel network architecture can be implemented and deployed in the existing network in the case where the normal traffic of the traditional network is not affected. A basic network architecture of the SDN is shown in FIG. 1.

At present, researches on the application of the SDN to an industrial control system have been carried out in industry at home and abroad. The United States Department of Energy (DOE) carried out an SDN-based industrial network research project in October, 2013 to introduce an SDN-based flow controller into an energy system, meet information transmission and exchange goals of an energy transfer system, and construct an energy transfer system which can maintain key functions, resist attack events and have elasticity. Moreover, in industry 4.0, the SDN is also used as important research content for industrial communications.

The transmission control technology of data communications can also be called an access control technology of communications, which is a security guarantee method for controlling data flow transmission in a network, and is applied to the design of various firewalls in general, especially firewalls based on packet filtering. The transmission control technology can enhance the security inside the network, and can determine that legal data communication flows are allowed to be transmitted, and illegal data communication flows are dropped. During access control, data parsing is performed by checking each data packet which flows through, the parsing result is matched with preset access control rules, one-one comparison is performed according to the order of the rules, and a processing operation conforming to the rules is executed, thereby protecting the communication security of the network. A processing operation of access control includes two manners in general: one manner is to prevent a transmission flow from passing through; and the other manner is to allow the transmission flow to pass through.

The communication flow transmission control of the industrial control system should be oriented to a plurality of industrial proprietary communication protocols, for example, Modbus/TCP, OPC, DNP3 and the like which all belong to an application layer protocol. Therefore, a deep packet parsing technology is needed to perform in-depth parsing on application data of various industrial proprietary communication protocols, so that the transmission control of an industrial communication data flow is implemented on this basis.

SUMMARY

In view of this, a purpose of the present invention is to provide a method for controlling transmission security of an industrial communication flow based on an SDN architecture, which conforms to the idea of "defense in depth", and solves the problems of vulnerability and security protection of an industrial control system based on an SDN architecture, thereby guaranteeing the security operation of the industrial control system.

A further purpose of the present invention is to provide a method for controlling transmission security of an industrial communication flow based on an SDN architecture, to complete in-depth parsing performed on application data for industrial proprietary communication protocols used in the industrial control system, implement control transmission of an industrial communication data flow, and detect and prevent abnormal intrusion behaviors, thereby protecting the security of critical infrastructure in industrial control systems.

To realize the above-mentioned purposes, the present invention discloses the technical solution: a method for controlling transmission security of an industrial communication flow based on an SDN architecture comprises the following steps:

Step 1: after receiving an industrial communication data flow sent by an industrial control terminal, an SDN switch parses a data packet first, matches with a flow table stored therein entry by entry, and if the data packet is matched with a certain entry, go to step 2; and if the data packet is matched with none of the entries of the flow table, go to step 3;

Step 2: the SDN switch checks whether a security control identifier of a corresponding matched entry of the flow table is 1, sends a flow ID, an industrial communication protocol type and application layer information in the data packet to a management controller if the security control identifier is 1, to request to detect communication content, go to step 4; and the SDN switch executes corresponding operations according to actions in the flow table if the security control identifier is 0;

Step 3: the SDN switch sends the data packet to the management controller, the management controller parses the data packet, establishes a flow transmission path, computes forwarded flow table information and allocates a flow ID for the data packet using an internal basic service function, then judges whether this data flow needs to be managed and controlled through a flow security control module, and if so, sets the security control identifier in the flow table information to be 1; otherwise, sets the security control identifier to be 0, and then sends the flow table information to all the SDN switches on the path;

Step 4: the flow security control module performs in-depth parsing on the application layer information in the data packet according to different industrial communication protocols, matches the parsing result with each industrial rule policy in the industrial rule policy database, and sends the detection result to an SDN switch if matching is successful, go to step 5; and informs the SDN switch to drop the overall industrial communication data flow if matching is not successful; and Step 5: the SDN switch further processes the industrial communication data flow according to the detection result.

The table entry structure of the flow table includes Packet header field, Count, Security control identifier, Action, wherein the packet header field is used for matching data packets;

the Count is used for counting the number of matched data packets;

the security control identifier is used for judging whether to perform flow security control; and the action is used for displaying a manner of processing matched data packets.

The action of the flow table includes Forward, Drop, Enqueue and/or Modify-Field.

The management controller has the basic service function for basic network management, including network topology management, network device registration, route computation, Qos guarantee, can maintain basic information about the entire network by maintaining the view of the entire network, can compute route path information, establish forwarded flow table information and allocate a flow ID for each communication data flow, and can send the flow table information to each SDN switch on the patch.

The flow table information is sent to all SDN switches on the path, only the security control identifier in the flow table information of the first SDN switch on the transmission path is set to be 1, and security control identifiers in the flow table information about other SDN switches are all set to be 0.

The flow security control module is used for completing two functions, including:

(1) for a data packet of a certain industrial communication data flow received for the first time, judging whether security transmission of the flow needs to be managed and controlled according to the industrial rule policy database, i.e. whether a security control identifier needs to be set when the forwarded flow table information is established; and (2) for a data packet of which security transmission of the flow needs to be managed and controlled, performing in-depth parsing on packet application layer content according to different industrial communication protocol specifications, matching the parsing result with each preset industrial rule policy, and executing a specified control processing operation of the industrial rule policy.

The industrial rule policy database is used for storing all industrial rule policies set by a user, and the industrial rule policy database is custom-added by the user, so that the user can perform modification, update and deleting operations on each of the industrial rule policies, wherein each industrial rule policy comprises a rule ID, a source IP address, a target IP address, an industrial communication protocol type, key field information content specified by a protocol specification and a processing operation part.

The industrial communication protocol type comprises general industrial communication protocols of Modbus/TCP, Modbus/UDP, DNP3, OPC, Profinet, IEC60870-5-104, MMS and GOOSE.

The flow security control module of the management controller saves a correlation between rule IDs of the industrial rule policies and the flow IDs, the correlation being a one-to-one correlation or a one-to-many correlation, thereby facilitating searching corresponding industrial rule policies through the flow IDs.

The method for controlling transmission security of an industrial communication flow based on an SDN architecture of claim 1, characterized in that the detection result of the security control module of the management controller reflects control processing operations specified by corresponding industrial rule policies, including two manners, i.e. dropping and processing according to actions in the flow table.

The present invention has the following advantages and beneficial effects:

1. It can be known form the above technical solution that compared with the prior art, the present invention provides a method for controlling transmission of an industrial communication flow based on an SDN architecture, on the basis of an SDN technology, adds mechanisms for checking and controlling industrial communication data, guarantees that the industrial terminal may not be illegally accessed and guarantees the security of the industrial control system based on an SDN architecture.

2. The method conforms to the basic security idea of "defense in depth", and can support division of key security regions performed on the industrial control system by setting industrial rule policies, to implement transmission control of flows among different regions.

3. In the method, a flow security control module is designed on the management controller, in-depth parsing performed on industrial proprietary communication protocols is supported, special communication security requirements of deep level detection of such content in the industrial control system are met, and the flow security control module is implemented on the management controller at the same time, thereby reducing the computing load of the SDN switch, increasing the overall security expandability of the network, and improving the management control capability of the user to network security in a manner of setting user-defined industrial rule policies.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

The method of the present invention belongs to a software defined network (SDN) scope. Software defined network is of a novel network innovation architecture, which changes the traditional fixed route configuration into flexible software form, so that control power on a network device is separated and then is managed by a centralized controller without shielding difference between network devices from the bottom layer by the network devices from the bottom layer. Moreover, since the control power is wide-open, the user can self-define any network route and transmission policy to be implemented, thereby being more flexible and intelligent. FIG. 1 is a schematic diagram showing a basic architecture of a typical SDN.

In order to guarantee communication security of an industrial control system based on an SDN architecture and prevent behaviors such as malicious attacks or mis-operations, the present invention provides a method for controlling transmission of an industrial communication flow based on an SDN architecture. See FIG. 2, which shows a basic model of the method for controlling transmission of an industrial communication flow based on an SDN architecture, the model mainly including three parts: a control plane, a data plane and a terminal plane.

Figure 2:
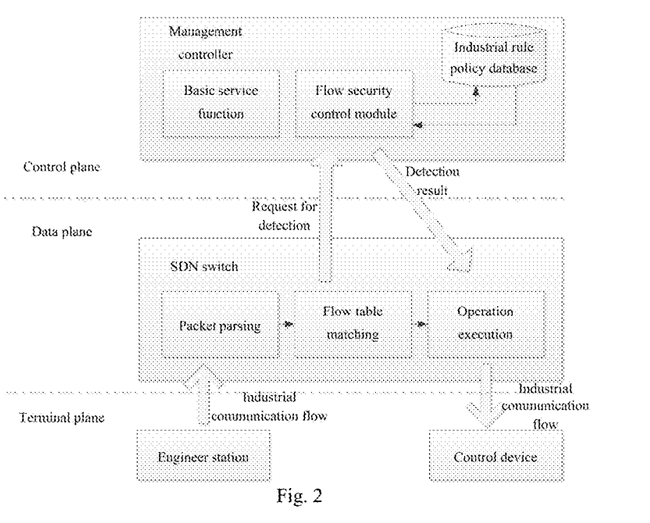
FIG. 2 is a schematic diagram showing a basic model of the present invention.

The control plane is mainly composed of one or more distributed management controllers. The management controller establishes route forwarding policies of all SDN switches on the data plane according to the specific state of the network and the configuration of the user. The management controller includes an original basic service function in the SDN and a newly added flow security control module, and meanwhile, the management controller also configures an industrial rule policy database for storing industrial rule policies set by the user according to the requirements of the flow security control module. The management controller has the basic service function for basic network management, including network topology management, network device registration, route computation, Qos guarantee, can maintain basic information (such as topology, network unit and provided services) about the entire network by maintaining the view of the entire network, can compute route path information, establish forwarded flow table information and allocate a flow ID for each communication data flow, and can send the flow table information to each SDN switch on the patch. The flow security control module mainly completes two functions, including: 1. for a data packet of a certain industrial communication data flow received for the first time, judging whether security transmission of the flow needs to be managed and controlled according to the industrial rule policy database, i.e. whether a security control identifier needs to be set when the forwarded flow table information is established; and 2. for a data packet of which security transmission of the flow needs to be managed and controlled, performing in-depth parsing on packet application layer content according to different industrial communication protocol specifications, matching the parsing result with each preset industrial rule policy, and executing a specified control processing operation of the industrial rule policy. In-depth parsing, also called deep packet inspection technology, belongs to the prior art and is recorded by pertinent literature at home and abroad. Reference can be made to http://blog.sina.com.cn/s/blog_4b108ce20100afwf.html.

Figure 3:
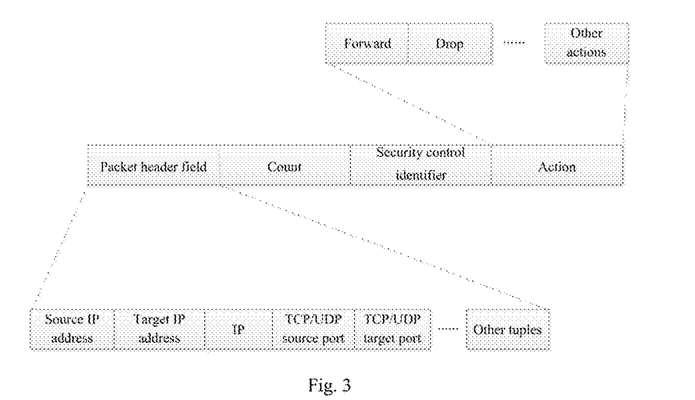
FIG. 3 is a schematic diagram showing a table entry structure in a flow table of an SDN switch in embodiments of the present invention.

The data plane mainly comprises SDN switches. All the SDN switches in the system are connected, and then an entire transmission network is formed thereby together. Each of the SDN switches is provided with one or more flow tables. A table entry structure of the flow table is mainly composed of four parts-Packet header field, Count, Security control identifier and Action. As shown in FIG. 3, the method of the present invention requires that the packet header field must comprise tuples including a source IP address, a target IP address, an IP, a TCP/UDP source port and a TCP/UDP target port, and other optional tuples may refer to the definition of the packet header field in the OpenFlow table, wherein the packet header field is used for matching data packets; the Count is used for counting the number of matched data packets; the security control identifier is used for judging whether to perform flow security control; the action is used for displaying a manner for processing matched data packets, and may include required actions such as Forward, Drop and the like, and may include optional actions such as Enqueue, Modify-Field and the like as well. In the method of the present invention, the SDN switch not only locally performs simple high-speed data forwarding according to a flow table, but also is responsible for sending a data packet of which flow transmission needs to be controlled to a management controller.

The terminal plane mainly comprises some typical industrial terminals, for example, a programmable logic controller PLC, a remote terminal unit RTU, a DCS controller, an engineer station, an operator station, an OPC Server, an OPC Client, a human-machine interface HMI and various industrial computation devices. In the method of the present invention, there is no need to make any change to the existing industrial terminal, i.e. the control plane and the data plane are transparent to the terminal plane, so that the industrial terminal equipment in the existing industrial control system can be completely suitable for the method of the present invention.

To clearly explain the execution process and processing method in the method for controlling transmission of an industrial communication data flow of the present invention, an application scenario of the Modbus/TCP protocol will be introduced in detail as follows. See FIG. 4, which is a schematic diagram showing an embodiment of an execution process of the method for controlling transmission of an industrial communication flow based on an SDN architecture.

Figure 4:
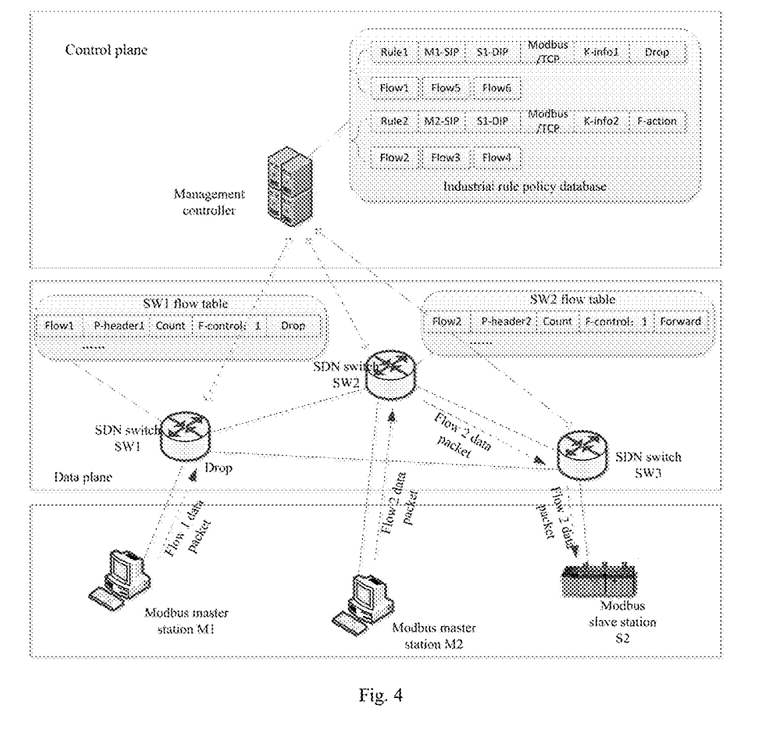
FIG. 4 is a schematic diagram showing an embodiment of an execution process of the present invention.

First, a user sets an industrial rule policy database according to specific security requirements. Two industrial rule policies, i.e. Rule1 and Rule2 are given in this embodiment, and main items in the rule policies represent the following meanings:

Rule 1 and Rule 2 represent rule IDs of industrial rule policies;

M1-SIP represents an IP address of a Modbus master station M1, M2-SIP represents an IP address of a Modbus master station M2, and S1-DIP represents an IP address of a Modbus slave station S1;

Modbus/TCP represents an industrial communication protocol type;

K-info1 and K-info2 respectively represent key field information specified by a Modbus/TCP protocol to be detected in the rule1 and the rule2; and Drop and F-Action respectively represent dropping the communication flows and processing same according to actions in the flow table.

Two communication flow processing manners in the method of the present invention are explained by two industrial communication flow execution processes as follows. It should be noted that only two frequently-used processing manners are given in the embodiment, and other processing manners suitable for the method the present invention are also belong to the protection scope of the present invention.

(1) When flow table information Flow1 corresponding to an industrial communication flow1 does not exist in an SDN switch SW1, for an execution process of a data packet of the industrial communication flow1:

Step 1: when a Modbus master station M1 sends a data packet of the communication flow1 to the SDN switch SW1, the SW1 extracts packet header information in the packet first after receiving the data packet and matches same with a flow table thereof entry by entry, and executes an action specified by this flow table if the packet header information is matched with a certain entry; and if the packet header information is matched with none of the entries, forwards the data packet to a management controller;

Step 2: after receiving the data packet of the communication flow1, the management controller establishes a flow transmission path and computes forwarded flow table information for the data packet first using a basic service function, then searches in an industrial rule policy database through a source IP address, a target IP address and an industrial communication protocol in the data packet (determined by a target port) using a flow security control module, determines that security transmission of this communication flow needs to be controlled if finding that the source IP address, the target IP address and the industrial communication protocol in the data packet are matched with M1-SIP, S1-DIP and Modbus/TCP in the Rule1 respectively, then performs in-depth parsing on the application layer data of the data packet, matches the parsed content with key field information K-info1 in the Rule1, sends the flow table information Flow1 and the control processing operation Drop the SW1 if matching is successful, and drops the data packet finally; and Step 3: after receiving the flow table information Flow1, the SDN switch SW1 takes the control processing operation Drop as an action of the flow table information Flow1, wherein at this moment, the P-header1 in the flow table information Flow1 is packet header field information about the data packet of flow1, count is a counter, F-control is a security control identifier, the value thereof is 1, and the action is Drop, i.e. drop processing; and when the SDN switch SW1 receives a data packet of a communication flow1 sent by a subsequent Modbus master station M1, the SW1 matches with the flow table information Flow1, and then executes drop processing.

(2) When flow table information Flow2 corresponding to an industrial communication flow2 exists in an SDN switch SW2, for an execution process of a data packet of the industrial communication flow2:

Step 1: when a Modbus master station M2 sends a data packet of the communication flow2 to the SDN switch SW2, the SW2 extracts packet header information in the packet after receiving the data packet and matches with a flow table thereof entry by entry, and sends flow ID: Flow2 and application layer information to a management controller if finding that the packet header information is successfully matched with flow information Flow2 and then checking that the security control identifier F-control is 1;

Step 2: after the management controller receives the information sent by the SW2, a flow security control module searches a corresponding industrial rule policy Rule2 through the flow ID: Flow2 first, then performs in-depth parsing on application layer information according to a Modbus/TCP protocol, matches the parsed content with key field information K-info2 in the Rule2, and sends a processing operation F-action to the SW2 if matching is successful; otherwise, informs the SW2 to drop this data packet; and Step 3: after receiving the processing operation F-action, the SW2 forwards the data packet of this communication flow2 according to the action Forward, i.e. forwarding processing in the flow table, so that the data packet of the communication flow2 is forwarded to the Modbus slave station S2 finally, thereby completing one access communication.

Figure 5:
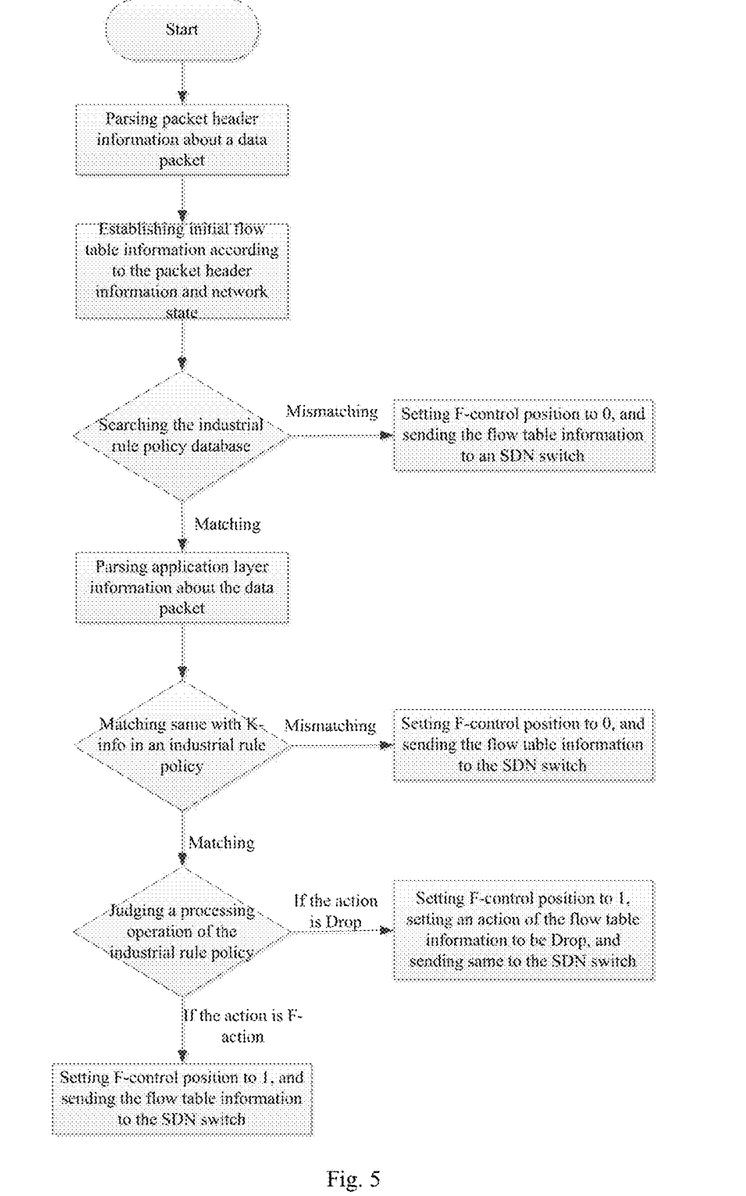
FIG. 5 is a schematic diagram showing a process of generating flow table information of the present invention.

To explain the detailed process of establishing the flow table information for the SDN switch by the management controller in the method of the present invention, see FIG. 5, which is a schematic diagram showing a process of generating the flow table information of the method for controlling industrial communication flow transmission based on an SDN architecture of the present invention. The main steps are as follows:

Step 1: after receiving a data packet sent by an SDN switch for the first time, a management controller parses packet header information about the data packet first using a basic service function, and then establishes initial flow table information including Flow ID, Packet header field, Count and Action according to the parsed packet header information, a network topology, a link state and the like, see the detailed process according to the method specified in the OpenFlow protocol, which will not be described in this patent in detail;

Step 2: a flow security control module in the management controller searches an industrial rule policy database according to a source IP address, a target IP address and an application layer protocol in the data packet, if the parsing result is matched with a certain industrial rule policy, go to step 3; and if the parsing result is matched with none of the industrial rule policies, the management controller sets the security control identifier F-control of the initial flow table information to be 0, and then sends this flow table information to the SDN switch;

Step 3: the management controller performs in-depth parsing on application layer information in the data packet according to different industrial communication protocol types, matches the parsed content with K-info in a corresponding industrial rule policy, if so, go to step 4; otherwise, the management controller sets the security control identifier F-control of the initial flow table information to be 0, and then sends this flow table information to the SDN switch; and Step 4: the management controller judges a processing operation manner of the corresponding industrial rule policy, if the processing operation is Drop, sets the security control identifier F-control of the initial flow table information to be 1, sets an action of the initial flow table information to be Drop, and then sends this flow table information to the SDN switch; and if the processing operation is F-action, sets the security control identifier F-control of the initial flow table information to be 1, and then sends this flow table information to the SDN switch.

Figure 6:
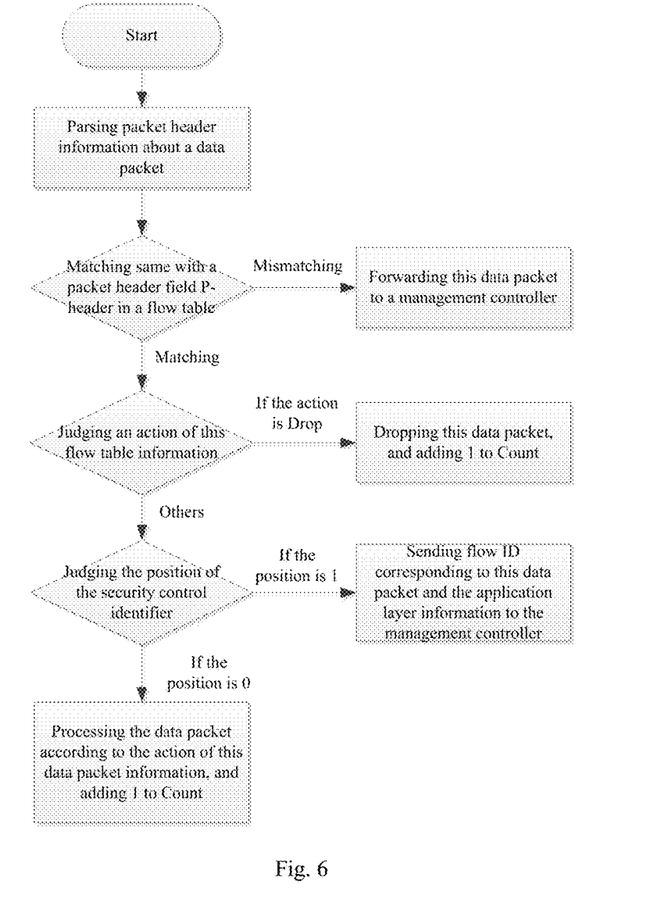
FIG. 6 is a schematic diagram showing a matching flow of the present invention.

See FIG. 6, which is a schematic diagram showing a flow of processing data packets by an SDN switch according to a flow table in the method for controlling transmission security of an industrial communication flow based on an SDN architecture of the present invention. The main steps are as follows:

Step 1: after receiving a data packet sent by a terminal, an SDN switch parses packet header information about the data packet first, matches with a packet header field P-header of each entry in a flow table stored therein, and if the packet header information is matched with a certain flow table information, go to step 2; and if the packet header information is matched with none of all the entries in the flow table, sends this data packet to a management controller for further processing;

Step 2: the SDN switch judges an action of this flow table information, if the action is Drop, drops this data packet directly, and adds 1 to the Count at the same time; and if the action is other action, i.e. Forward, Enqueue or Modify, go to step 3; and Step 3: the SDN switch continuously judges a security control identifier F-control of this flow table information, and sends a flow ID and application layer information corresponding to this data packet to the management controller for further processing if the security control identifier is 1; and processes the data packet according to the action of this data packet information, and adds 1 to the Count at the same time.

We claim:

1. A method for controlling transmission security of an industrial communication data flow based on a software defined network (SDN) architecture, which comprises the following steps:

Step 1: after receiving an industrial communication data flow sent by an industrial control terminal, an SDN switch parses a data packet, checks for a matching data packet in a flow table stored therein entry by entry, and: when the data packet is matched with a certain entry of the flow table, proceeds to step 2; and when the data packet is not matched with any entry of the flow table, proceeds to step 3;

Step 2: the SDN switch checks a security control identifier of the corresponding matched entry of the flow table, and: when the security control identifier is a first identifier, sends a request to detect communication content, with a flow ID, an industrial communication protocol type, and application layer information in the data packet, to a management controller and proceeds to step 4; and when the security control identifier is a Second identifier, the SDN switch executes corresponding operations according to actions in the flow table;

Step 3: the SDN switch sends the data packet to the management controller, the management controller parses the data packet, establishes a flow transmission path, computes forwarded flow table information, allocates a flow ID for the data packet using an internal basic service function, and judges whether the industrial communication data flow needs security control through a flow security control module, and: when it is determined that security control is needed, sets the security control identifier in the flow table information to the first identifier; and when it is determined that security control is not needed, sets the security control identifier to the second identifier, and the management controller then sends the flow table information to all SDN switches on the flow transmission path;

Step 4: the flow security control module performs in-depth parsing on the application layer information in the data packet according to different industrial communication protocols, checks for matches of the parsing result with each industrial rule policy in an industrial rule policy database, and; when matching is successful, sends a detection result to the SDN switch, and proceeds to step 5; and when matching is not successful, informs the SDN switch to drop the overall industrial communication data flow; and Step 5; the SDN switch further processes the industrial communication data flow according to the detection result.

2. The method of claim 1, wherein the flow table has a table entry structure comprising: a packet header field, a count field, a security control identifier field, and an action field, wherein
   the packet header field is used for matching data packets;
   the count field is used for counting the number of matched data packets;
   the security control identifier field is used for judging whether to perform flow security control; and
   the action field is used for displaying a manner of processing matched data packets.

3. The method of claim 2, wherein the flow table accepts "Forward", "Drop","Enqueue" and/or "Modify-Field" in the action field.

4. The method of claim 1, wherein the management controller: has the basic service function for basic network management, including network topology management, network device registration, route computation, and Qos guarantee; can maintain basic information about the entire network by maintaining the view of the entire network; can compute route path information, establish forwarded flow table information, and allocate a flow ID for each communication data flow; and can send the flow table information to each SDN switch on the flow transmission path.

5. The method of claim 1, wherein the flow table information is sent to all SDN switches on the flow transmission path, only the security control identifier in the flow table information of a first SDN switch on the flow transmission path is set to the first identifier, and security control identifiers in the flow table information of other SDN switches on the flow transmission path are all set to the second identifier.

6. The method of claim 1, wherein the flow security control module operates such that:
   (1) for a data packet of an industrial communication data flow received for the first time, judging whether security transmission of the industrial communication data flow needs security control according to the industrial rule policy database, and setting a corresponding security control identifier, when establishing flow table information for forwarding; and
   (2) for a data packet of an industrial communication data flow that was previously judged to need security control, performing in-depth parsing on packet application layer content according to different industrial communication protocol specifications, matching the parsing result with each preset industrial rule policy, and executing a specified control processing operation of the industrial rule policy.

7. The method of claim 1, wherein
the industrial rule policy database stores all industrial rule policies set by a user, and is customizable by the user, so that the user can modify, update, and delete operations for each of the industrial rule policies, and
each industrial rule policy comprises a rule ID, a source IP address, a target IP address, an industrial communication protocol type, key field information content specified by a protocol specification, and a processing operation part.

8. The method of claim 1, wherein the industrial communication protocol type comprises general industrial communication protocols of Modbus/TCP, Modbus/UDP, DNP3, OPC, Profinet, IEC60870-5-104, MMS, and/or GOOSE.

9. The method of claim 1, wherein the flow security control module of the management controller saves a correlation between rule IDs of the industrial rule policies and flow IDs, the correlation being a one-to-one correlation or a one-to-many correlation.

10. The method of claim 1, wherein the detection result of the flow security control module of the management controller reflects control processing operations specified by corresponding industrial rule policies, including dropping and processing according to an action field in the flow table.

11. A method for controlling transmission security of a data flow based on a software defined network (SDN) architecture, comprising:
an SDN switch receiving a data flow, parsing a data packet of the data flow, and checking for a matching data packet in a flow table stored at the SDN switch, wherein
when the data packet is not matched with any entry in the flow table:
the SDN switch sends the data packet to a management controller;
the management controller judges whether the data flow needs security control and establishes flow table information that includes a security control identifier, wherein: when it is determined security control is needed, the management controller sets the security control identifier to a first identifier; and when it is determined security control is not needed, the management controller sets the security control identifier to a second identifier; and
the management controller sends the flow table information to all SDN switches on a transmission path;
when the data packet is matched with an entry in the flow table:
the SDN switch checks a security control identifier of the matched entry in the flow table, wherein: when the security control identifier is the first identifier, the SDN switch sends a request to the management controller to detect data flow content; and when the security control identifier is the second identifier, the SDN switch executes one or more corresponding operations according to actions in the flow table;
when the management controller receives a request to detect data flow content:
a flow security control module of the management controller performs in-depth parsing on application layer information in the data packet, and checks for matches of the parsing result with each industrial rule policy in an industrial rule policy database, wherein: when a match is found, the management controller sends a detection result to the SDN switch; and when a match is not found, the management controller instructs the SDN switch to drop the data flow; and
when the SDN switch receives a detection result from the management controller, the SDN switch processes the data flow according to the detection result.

12. The method of claim 11, wherein the flow table has a table entry structure comprising: a packet header field, a count field, a security control identifier field, and an action field.

13. The method of claim 12, wherein the flow ab e accepts "Forward", "Drop", "Enqueue" and/or "Modify-Field" in the action field.

14. The method of claim 11, Wherein the management controller computes route path. information, establishes flow table information, and allocates a flow ID for each communication data flow.

15. The method of claim 11, wherein
in the flow table information sent to a first SDN switch on the transmission path, the security control identifier is set to the first identifier, and
in the flow table information sent to the other SDN switches on the transmission path, the security control identifier is set to the second identifier.

16. The method of claim 11, wherein the flow security control module operates such that:
(1) for a data packet of a data flow received for the first time, the flow security control module judges whether the data flow needs security control according to the industrial rule policy database and sets a corresponding security control identifier; and
(2) for a data packet of a data flow that was previously judged to need security control, the flow security control module performs in-depth. parsing on packet application layer content according to industrial communication protocol specifications, matches the parsing result with a preset industrial rule policy, and executes a processing operation of a matched industrial rule policy.

17. The method of claim 11, wherein
the industrial rule policy database stores all industrial rule policies set by a user, and is customizable by the user, so that the user can modify, update, and delete operations for each of the industrial rule policies, and
each industrial rule policy comprises a rule ID, a source IP address, a target IP address, an industrial communication protocol type, key field information content specified by a protocol specification, and a processing operation part.

18. The method of claim 11, wherein the industrial communication protocol type comprises general industrial communication protocols of Modbus/TCP, Modbus/UDP, DNP3, OPC, Profinet, IEC60870-5-104, MMS, and/or GOOSE.

19. The method of claim 11, wherein the flow security control module of the management controller saves a correlation between rule IDs of the industrial rule policies and flow IDs, the correlation being a one-to-one correlation or a one-to-many correlation.

20. The method of claim 11, wherein the detection result of the flow security control module of the management controller reflects control processing operations specified by corresponding industrial rule policies, including an operation for dropping and an operation for processing according to an action field in the flow table.

* * * * *